(12) United States Patent
Britz et al.

(10) Patent No.: US 6,802,070 B2
(45) Date of Patent: Oct. 5, 2004

(54) COMPACT DISC TRANSPORTER

(75) Inventors: Todd A. Britz, Lakeville, MN (US); Robert P. Cummins, Deephaven, MN (US)

(73) Assignee: Primera Technology, Inc., Plymouth, MN (US)

( * ) Notice: Subject to any disclaimer, the term of this patent is extended or adjusted under 35 U.S.C. 154(b) by 578 days.

(21) Appl. No.: 09/874,843

(22) Filed: Jun. 5, 2001

(65) Prior Publication Data

US 2002/0009022 A1 Jan. 24, 2002

Related U.S. Application Data

(60) Provisional application No. 60/210,693, filed on Jun. 9, 2000.

(51) Int. Cl.[7] .......................... G11B 17/04; G11B 17/22
(52) U.S. Cl. .................. 720/619; 369/30.55; 369/178.4
(58) Field of Search .............................. 369/30.55, 178; 360/92; 294/93, 94, 95, 97; 720/619

(56) References Cited

U.S. PATENT DOCUMENTS

| | | | |
|---|---|---|---|
| 5,291,465 A | 3/1994 | Dennis | |
| 5,505,509 A | * 4/1996 | Vance | 294/16 |
| 5,692,878 A | * 12/1997 | Freund | 414/796.6 |
| 5,873,692 A | 2/1999 | Costas | 414/796.9 |
| 5,897,153 A | * 4/1999 | Philipps et al. | 294/93 |
| 5,914,918 A | * 6/1999 | Lee et al. | 369/30.32 |
| 5,927,208 A | 7/1999 | Hagstrom et al. | 101/486 |
| 5,946,216 A | 8/1999 | Hollerich | 364/478.11 |
| 6,041,703 A | * 3/2000 | Salisbury et al. | 101/37 |
| 6,111,847 A | * 8/2000 | Assadian | 369/30.55 |
| 6,220,640 B1 | * 4/2001 | Jensen et al. | 294/93 |
| 2004/0005213 A1 | * 1/2004 | Hegedus | 414/785 |

OTHER PUBLICATIONS

U.S. Provisional application No. 60/210,693, filed Jun. 9, 2000, and entitled "CD Transporter".

* cited by examiner

Primary Examiner—Allen Cao
(74) Attorney, Agent, or Firm—Westman, Champlin & Kelly

(57) ABSTRACT

A CD transporter includes a CD gripper for gripping a top CD off a vertical stack of CD's is provided. The CD gripper includes an actuatable gripping member and at least one stationary gripping member, each of which includes a hub engaging surface. The actuatable gripping member also includes a CD separating protrusion for separating the top CD from the CD immediately therebelow.

24 Claims, 8 Drawing Sheets

COMPACT DISC TRANSPORTER

CROSS-REFERENCE TO RELATED APPLICATION

This application claims priority to U.S. Provisional Application No. 60/210,693 entitled "CD TRANSPORTER" and filed Jun. 9, 2000 by Todd A. Britz and Robert P. Cummins.

FIELD OF THE INVENTION

The present invention relates to a compact disc (CD) transporter that is used to retrieve CD's from an input stack of CD's and deliver them to a processing device or retrieve them from the processing device.

BACKGROUND

CD-like media, such as compact discs (CD's), digital video discs (DVD's), and recordable CD's, can be used to store digital information such as audio and video information, software programs, and other types of data. These CD-like media are generally formed of a plurality of layers including a reflective inner layer on which digital information is recorded and a protective top layer upon which text and graphics can be printed. Hereinafter, the use of the term "compact disc" or "CD" is intended to describe these and other rigid CD-like media.

CD's may be processed in several different ways including recording digital information onto the reflective inner layer using a CD recording device and printing text and graphics on the protective top layer using a printing device such as an inkjet or a thermal transfer printer. One such suitable inkjet printer is the Signature II™ CD color printer manufactured by Primera Technology, Inc. of Plymouth, Minn., which is described in U.S. Pat. No. 5,927,208, and is incorporated herein by reference. An example of a suitable thermal transfer CD printer is the Inscripta™ printer, which is also manufactured by Primera Technology, Inc. of Plymouth, Minn.

A CD transporter is used to automate the processing of CD's by providing CD's to the processing device for processing and retrieving processed CD's from the processing device without human intervention. CD transporters generally include a CD gripper that is adapted to retrieve a single CD from an input stack of CD's and deliver it to the processing device for processing. Once the processing of the CD is completed, the CD gripper can retrieve the processed CD from the processing device and stack the CD in an output stack, discard the processed CD to a reject stack, or deliver the processed CD to another processing device.

Unfortunately, static charge on the CD's, moisture between the contacting surfaces of the CD's, or the formation of a vacuum between the CD's, can cause the CD gripper to retrieve multiple CD's from the stack resulting in a disruption of the automated process. Consequently, there is a need for an improved CD gripper for use with a CD transporter, which reduces the likelihood of unintentionally gripping multiple CD's from a stack of CD's.

SUMMARY

The present invention is directed toward a CD gripper that is configured to separate a top CD from an adjacent CD positioned immediately therebelow prior to gripping the top CD. The CD gripper includes an actuatable gripper member and at least one stationary gripping member. Both of the gripping members include a hub engaging surface. The actuatable gripping member further includes a CD separating protrusion for separating the top CD from the adjacent CD.

The present invention is further directed toward a CD transporter that includes the above described CD gripper and further includes a base, a crane coupled to the base and adapted to support the CD gripper, and a support tray for supporting a vertical stack of CD's.

DETAILED DESCRIPTION OF THE PREFERRED EMBODIMENTS

Figure 1:
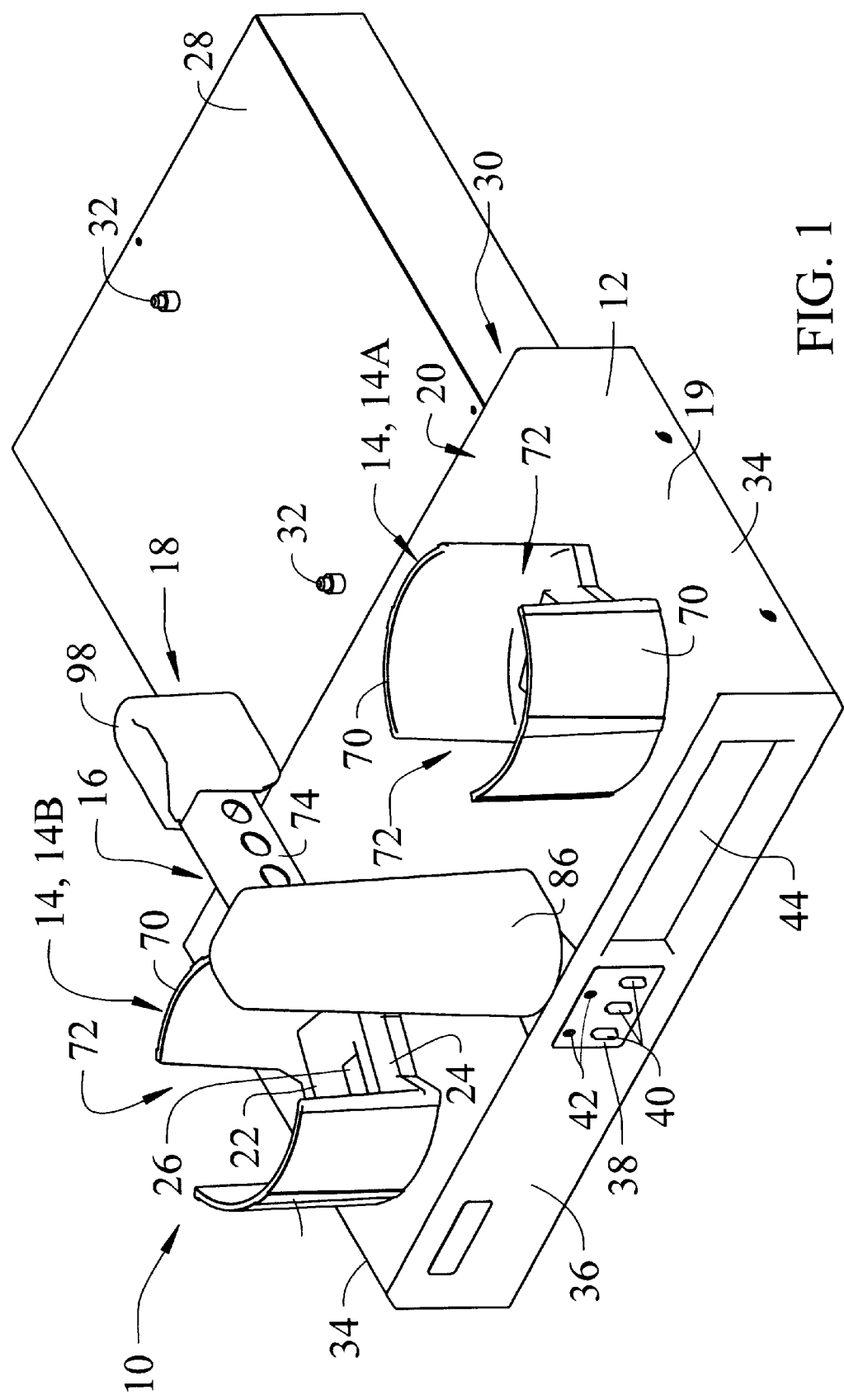
FIGS. 1 and 2 are perspective views of a CD transporter in accordance with various embodiments of the invention.

FIG. 1 shows a perspective view of a CD transporter 10 in accordance with various embodiments of the present invention. CD transporter 10 generally includes base 12, CD support trays 14, crane 16, and CD gripper 18. Base 12 includes cover 19 with top surface 20 that supports trays 14 and crane 16. Top surface 20 also includes tray mounts 22 which are adapted to properly align trays 14 such that CD gripper 18 can be properly aligned with CD's (not shown) contained in trays 14. In one embodiment, mounts 22 are shaped to mate with base 24 of trays 14 to provide the desired alignment of tray 14. For example, mounts 22 can have a rectangular shape which corresponds to the shape of an opening 26 at base 24 of tray 14. Mounting of tray 14 to base 12 is accomplished by fitting opening 26 over mounts 22 resulting in the proper alignment of tray 14 with respect to crane 16 and CD gripper 18.

Base 12 can also provide an interface for mating with a processing device base 28, shown attached to base 12 at backside 30 of base 12 in the illustrative example of FIG. 1. A processing device can be mounted to processing device base 28 such that it can interact with CD transporter 10. Locating pins 32 are generally used to align the processing device with CD transporter 10. Additional processing device bases 28 can be attached to either side 34 of base 12.

Base 12 also includes front panel 36 having control panel 38 which can be used to display information and control the operation of CD transporter 10. Control panel 38 can include buttons 40 and LED's 42. Buttons 40 can be used to control the power to CD transporter 10, step through programmed movements of crane 16 and CD gripper 18, and calibrate CD transporter 10. LED's 42 can be used to indicate the status of CD transporter 10 such as whether CD transporter 10 is "on" and the current step of a program. Base 12 can also include a CD recording device (not shown) at bay 44.

Figure 2:
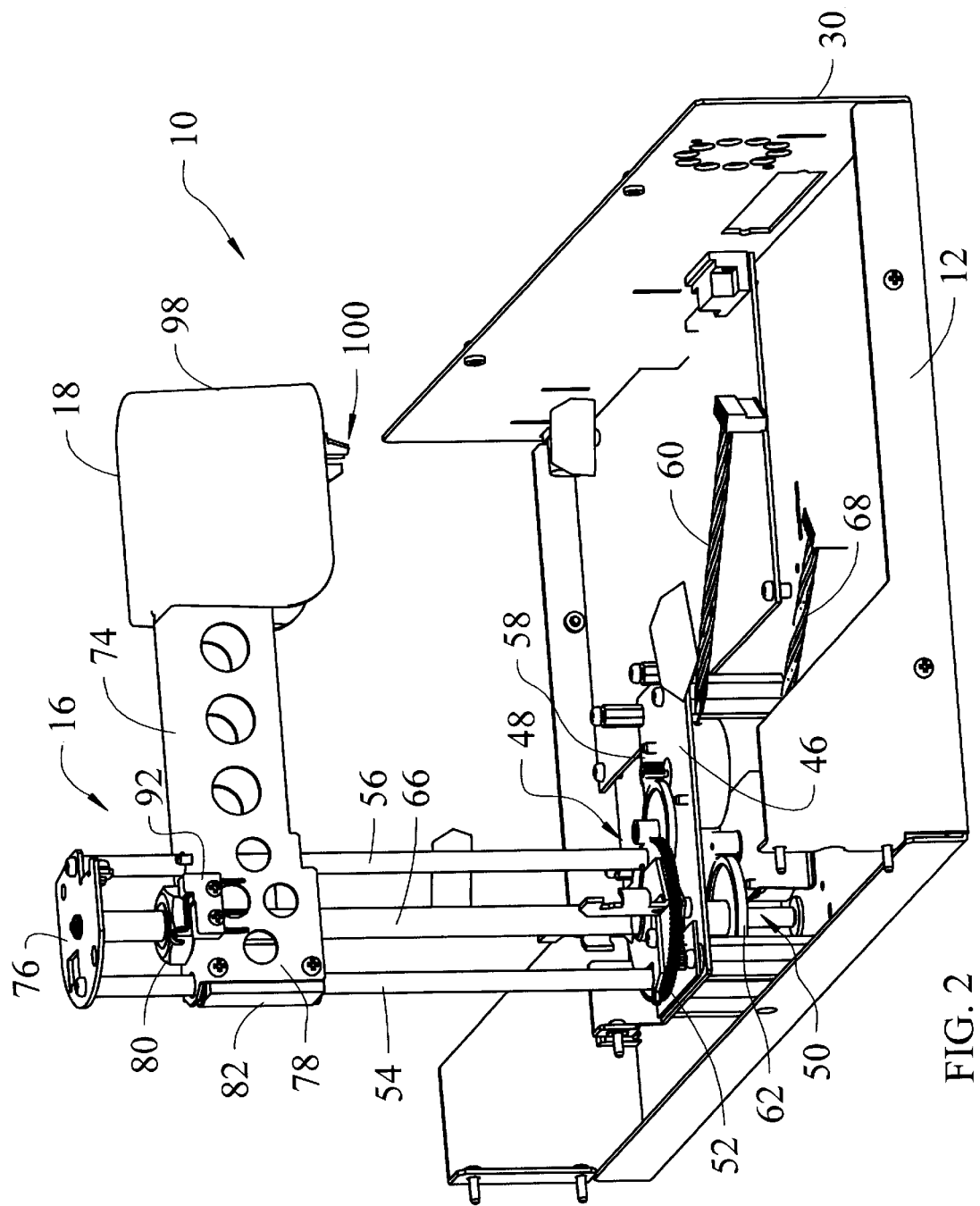

FIG. 2 shows CD transporter 10 with cover 19 of base 12 removed. The interior of base 12 includes crane mount base 46, crane rotator 48, lead screw rotator 50, and control circuitry (not shown). Crane rotator 48 generally includes gear 52 to which are coupled rods 54 and 56 of crane 16. Crane rotator 48 also includes motor 58 which controls the rotation of gear 52. Wiring 60 electrically couples crane rotator 48 to control circuitry (not shown).

Lead screw rotator 50 controls the raising and lowering of CD gripper 18 and includes gear 62 and motor 64. Gear 62 couples to lead screw 66 of crane 16. Motor 64 controls the rotation of gear 62 and, thus, the rotation of lead screw 66. Wiring 68 electrically couples lead screw rotator 50 to control circuitry (not shown)

Trays 14, shown in FIG. 1, generally include cylindrical side walls 70 which define a cylindrical cavity that is adapted to receive a vertical stack of CD's (not shown). Openings 72 between side walls 70 allow CD gripper 18 to access CD's held by tray 14. In the example configuration shown in FIG. 1, two CD trays 14 are positioned on opposite sides of crane 16. Here, tray 14A can act as an input tray that stores CD's which are to be processed and tray 14B can be an output tray for holding processed CD's. Other configurations, such as different placements of trays 14 are possible to accommodate different process devices provided that CD support trays 14 are within the reach of CD gripper 18.

Crane 16 generally includes extension arm 74, rods 54 and 56, and lead screw 66 as shown in FIG. 2. Crane 16 can also include cover 86 shown in FIG. 1. Mounting bracket 76 couples to and fixes the ends of rods 54 and 56 and rotatably couples to lead screw 66. Extension arm 74 includes proximal end 78 through which rods 54 and 56 and lead screw 66 extend. Lead screw 66 threadably couples to the proximal end 78 of extension arm 74 at threaded coupling 80, shown in FIGS. 2–4. Mounting block 82, shown in FIGS. 2 and 3, slidably couples to rod 54 and maintains extension arm 74 in a horizontal plane. Mounting block 82 includes bushings 84 which further secure the slidable connection between mounting block 82 and rod 54. Rod 56 extends through aperture 90 of extension arm 74. Crane rotator 48 is adapted to rotate crane 16 about an axis coinciding with lead screw 66.

Figure 4:
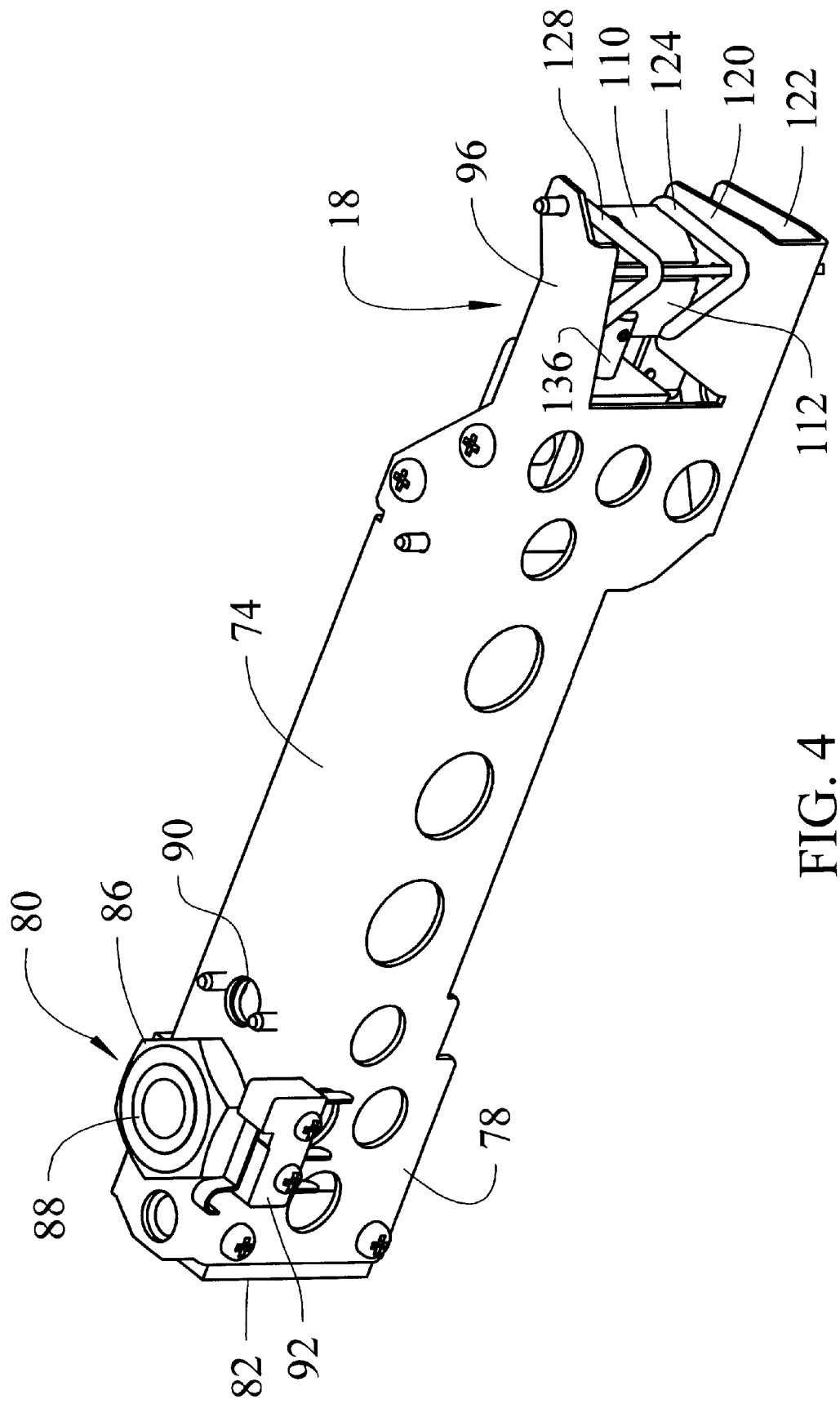

Threaded coupling 80 includes hex screw 86 and lead screw adapter 88, as shown in FIG. 4. Hex screw 86 threadably couples to extension arm 74. Lead screw adapter 88 includes an outer threaded portion which threadably couples to an inner threaded portion of hex screw 86 to secure lead screw adapter 88 within a bore of hex screw 86. Lead screw adapter 88 is adapted to threadably couple to lead screw 66 such that rotation of lead screw 66 causes extension arm 74 to be raised or lowered depending upon the direction of rotation of lead screw 66.

Figure 3:
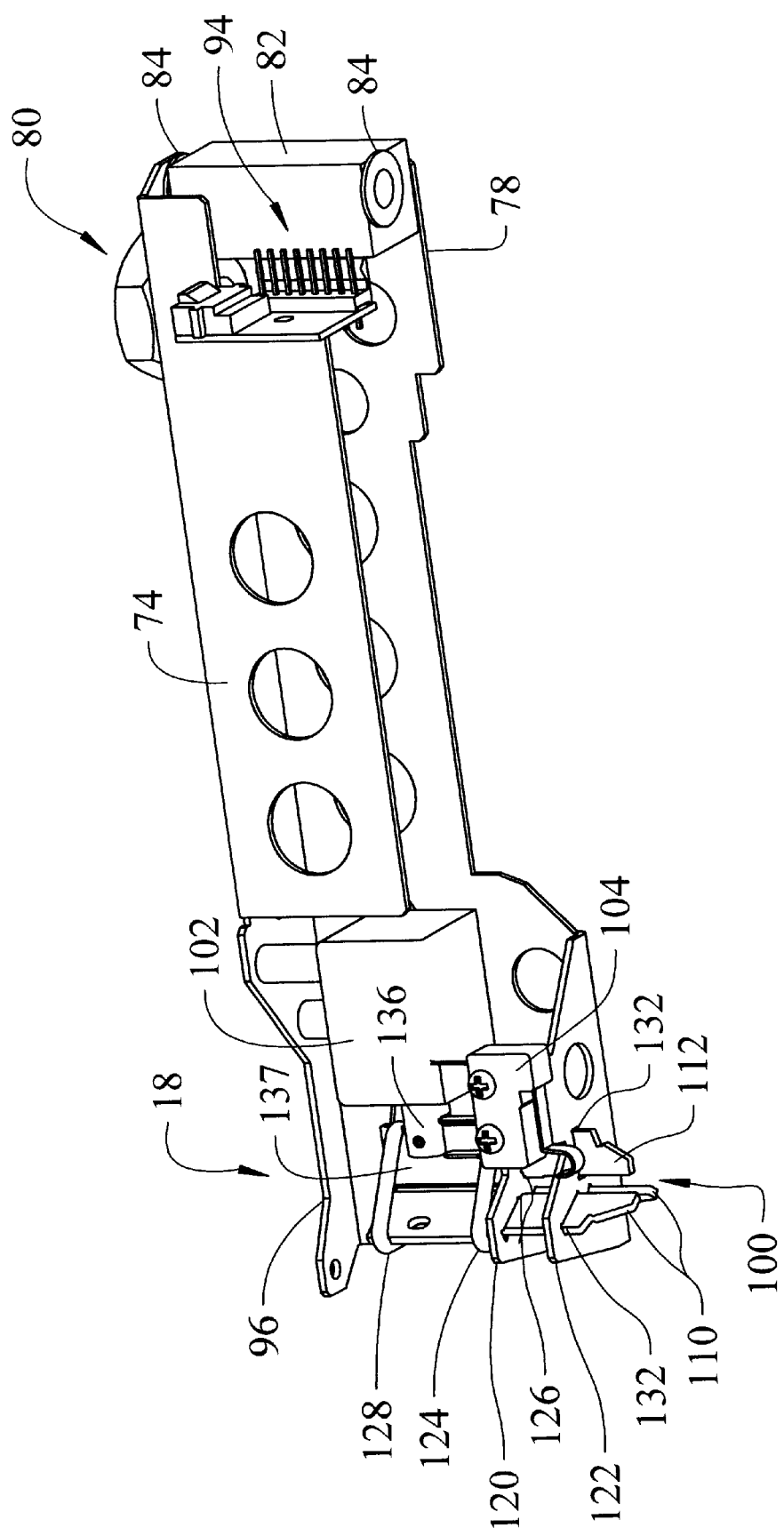
FIGS. 3 and 4 show perspective views of an extension arm of a crane and a CD gripper in accordance with various embodiments of the invention.

Limit switch 92, coupled to proximal end 78 of extension arm 74, indicates a reference point for extension arm 74. In one embodiment, limit switch 92 is adapted to be triggered by mounting bracket 76 when extension arm 74 is sufficiently raised. Limit switch 92 can communicate with control circuitry (not shown) to prevent further raising of extension arm CD gripper 18 couples to distal end 96 of extension arm 74. CD gripper 18 can include a cover 98, as shown in FIGS. 1 and 2. Referring now to FIG. 3, CD gripper 18 generally includes gripping members 100, solenoid 102, and sensor 104. Flex cable connecting pins 94 (FIG. 3) can be wired to solenoid 102 of CD gripper 18 and coupled to a flex cable (not shown) through which control signals can be sent to CD gripper 18 from the control circuitry of CD transporter 10.

Figure 5:
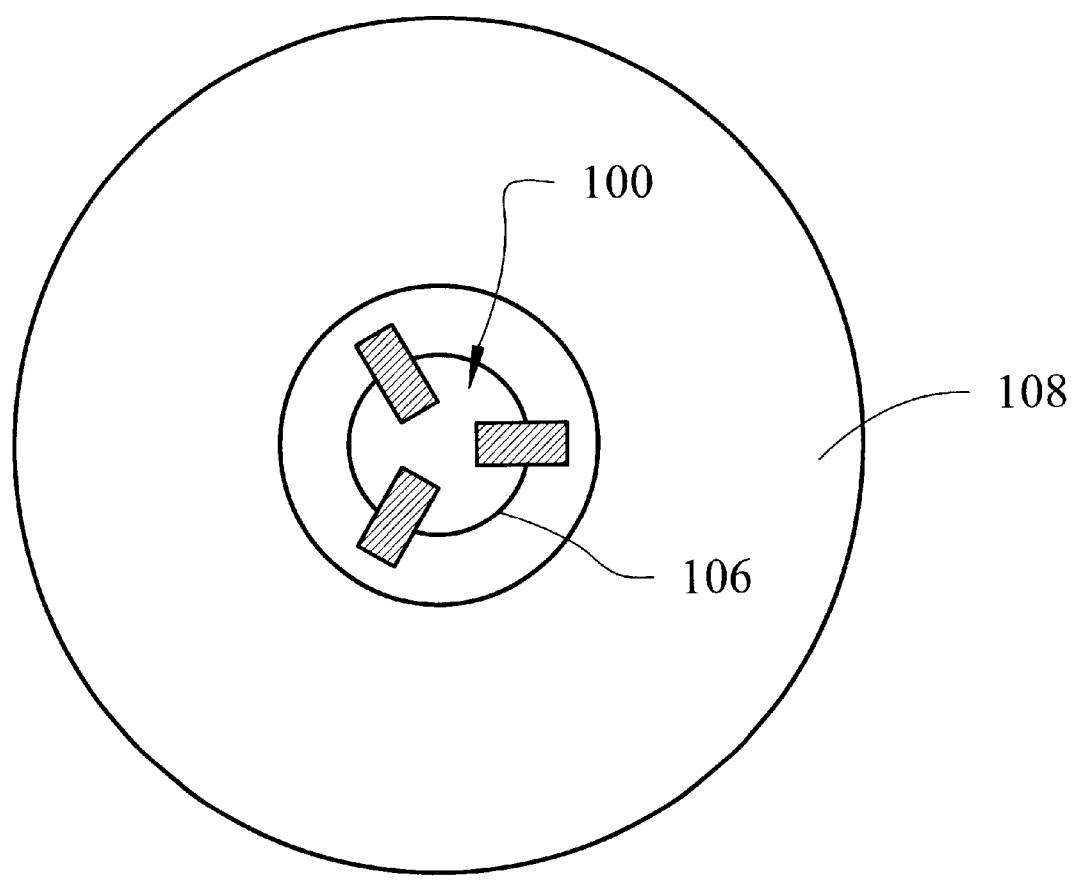
FIG. 5 shows gripping members of a CD gripper gripping a hub of a CD, in accordance with one embodiment of the invention.
Figures 6, 7:
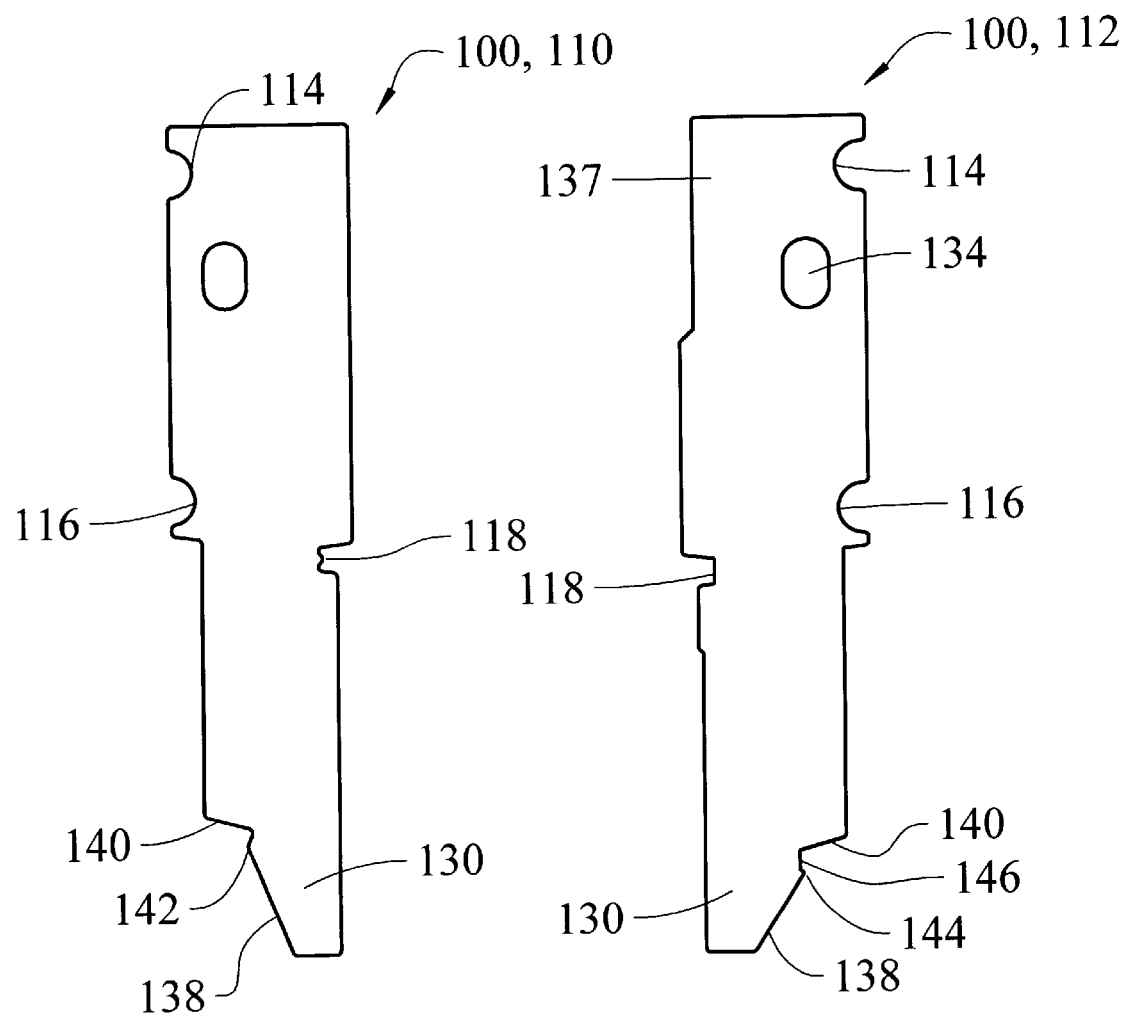
FIGS. 6 and 7 show side views of a stationary gripping member and an actuatable gripping member, respectively, in accordance with various embodiments of the invention.

Gripping members 100 are vertically oriented in opposition to each other and are configured to grip a hub 106 of a CD 108, as shown in FIG. 5. Gripping members 100 generally include two stationary gripping members 110 and actuatable gripping member 112 which are best shown in FIGS. 6 and 7, respectively. Each of the gripping members 110 and 112 include top o-ring groove 114, bottom o-ring 116, and pivot notch 118. Gripping members 100 are inserted through slots of first and second gripping member supports 120 and 122, respectively, which are shown in FIG. 3. Bottom o-ring 124 attaches to gripping members 100 at bottom o-ring grooves 116 and forces pivot notches 118 of gripping members 100 against the innermost edge 126 of the slots in first gripping member support 120. Top o-ring 128 attaches to gripping members 100 at top o-ring grooves 114 and acts to pivot gripping members 100 about pivot notches 118 such that gripping ends 130 of gripping members 100 are rotated outwardly against outermost edge 132 of second gripping member support 122. As a result, bottom and top o-rings 124, 128 act to secure gripping members 100 and bias gripping ends 130 outwardly.

Actuatable gripping member 112 includes aperture 134 which couples to piston 136. Solenoid 102 is configured to actuate piston 136 to move actuatable gripping member 112 between a gripping position and a release position. Solenoid 102 moves actuatable gripping member 112 to the release position by pulling end 137 toward solenoid 102 thereby overcoming the inwardly directed bias produced by top o-ring 128 and pivoting gripping end 130 of actuatable gripping member 112 inwardly about pivot notch 118. Actuatable gripping member 112 can be returned to the gripping position by extending piston 136 or by releasing piston 136 allowing it to move outwardly from solenoid 102 to return gripping end 130 of actuatable gripping member 112 against outermost edge of the slot of second gripping member support 122 or against hub 106 of disc 108 if present.

Figure 8:
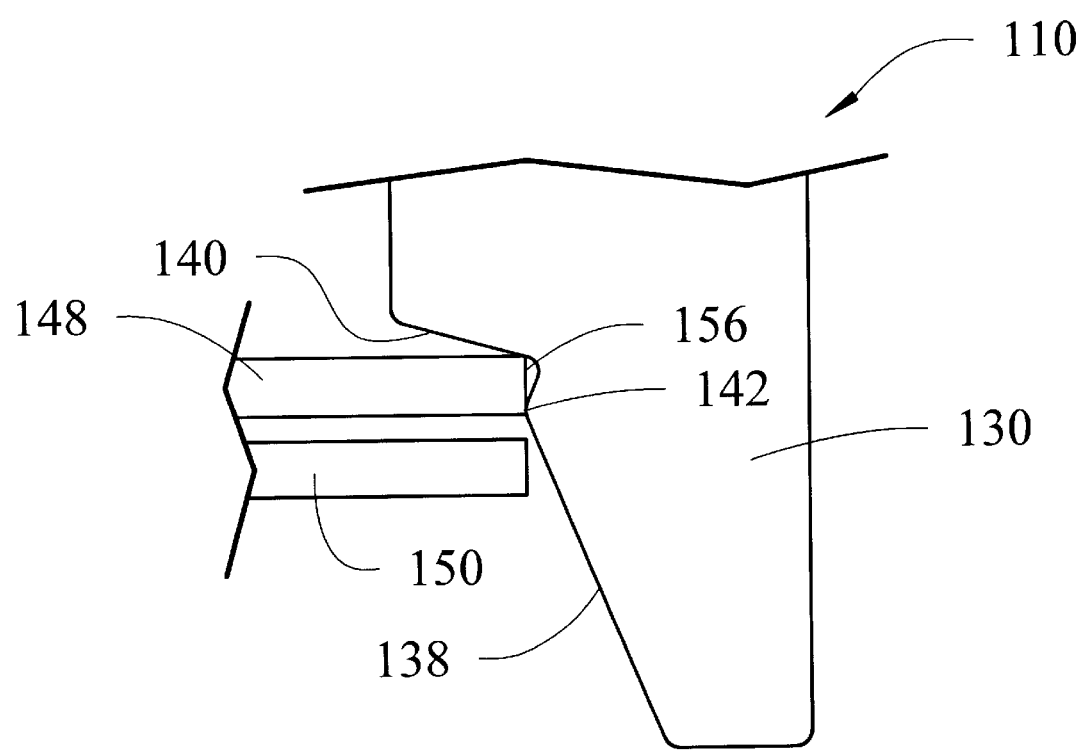
FIG. 8 shows a magnified view of a gripping end of a stationary gripping member gripping a CD, in accordance with various embodiments of the invention.

Referring now to FIGS. 6 and 7, each gripping member 100 also includes guide surface 138 and limiting surface 140. Guide surfaces 138 act to guide gripping members 100 into hub 106 (FIG. 5) of a top CD in a stack as they are lowered crane 16 with actuatable gripping member 112 in the release position. Limiting surface 140 generally engages a top surface of the top CD and acts to position gripping members 100 at the appropriate height for gripping the top CD. This height is also controlled by sensor 104 which is configured to sense the top surface of the top CD. Sensor 104 provides control circuitry (not shown) with a signal to indicate that gripping members 100 are in position to grip the top CD. Stationary gripping member 110 also includes protrusion 142 that engages hub 106 of the top CD when actuated gripping member 112 is moved to the gripping position, as shown in FIG. 8.

Figure 9:
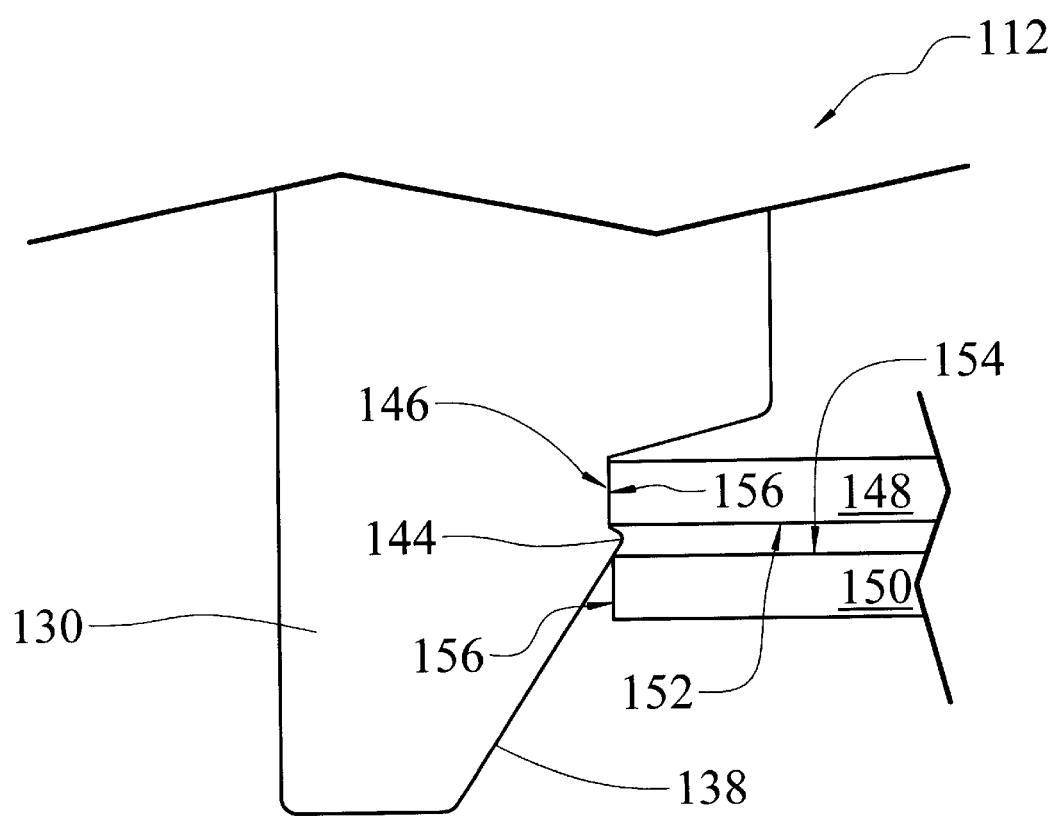
FIG. 9 shows a magnified view of a gripping end of an actuatable gripping member separating a top CD from an adjacent CD and gripping the top CD, in accordance with various embodiments of the invention.

Actuatable gripping member 112 includes CD separating protrusion 144, as shown in FIGS. 7 and 9. CD separating protrusion 144 acts to separate a top CD 148 from an adjacent CD 150, positioned directly below top CD 148, when actuatable gripping member 112 is moved from the release position to the gripping position, as shown in FIG. 9. As Actuatable gripping member 112 is moved from the release position to the gripping position, CD separating protrusion 144 is wedged between bottom surface 152 of CD 148 and top surface 154 of CD 150 forcing top CD 148 to separate from adjacent CD 150. This feature of the present invention is advantageous since CD's can stick together due to static charge on the CD's, moisture between the contacting surfaces (152 and 154) of the CD's, or the formation of a vacuum between the CD's.

When actuatable gripping member 112 reaches the gripping position, stationary gripping members 110 exert a radial force on hub 156 of top CD 148 at protrusion 142 and actuatable gripping member 112 exerts a radial force on hub 156 of top CD 148 at surface 146. Gripping members 110 and 112 can support top CD 148 due to the frictional resistance between protrusions 142, surface 146, and hub 156 of CD 148. CD 148 is further supported by a vertical force applied by CD separating protrusion 144 at bottom surface 152 of top CD 148.

Control circuitry (not shown) of CD transporter 10 is generally adapted to control the operations CD transporter 10. For example, the control circuity can control the angular position of CD gripper 18 by controlling the operation of crane rotator 46 and the height of CD gripper 18 by controlling the operation of lead screw rotator 50. Additionally, the control circuitry is adapted to control the movement of actuatable gripping member 112 between the gripping position and the release position through control of solenoid 102. The control circuitry of CD transporter 10 can further communicate with the elements of control panel 38 to display information on control panel 38 and to receive control signals from buttons and other control elements that may be located on control panel 38. The control circuitry can also be configured to communicate with processing electronics located externally to CD transporter 10, such as that of a personal computer. Here, program instructions which define various actions of CD transporter 10 and status information can, for example, be transferred between the control circuitry and the external processing electronics. The control circuitry can also include a memory for storing program instructions and other data as well as processing electronics for executing the program instructions.

Although the present invention has been described with reference to preferred embodiments, workers skilled in the art will recognize that changes may be made in form and detail without departing from the spirit and scope of the invention.

What is claimed is:

1. A compact disc (CD) gripper for gripping a top CD off a vertical stack of CD's, each of the CD's having a hub, the CD gripper comprising:
   an actuatable gripping member having a hub engaging surface and a CD separating protrusion; and
   at least one stationary gripping member having a hub engaging surface.

2. The CD gripper of claim 1, including an actuator coupled to the actuatable gripping member and adapted to actuate the actuatable gripping member between a gripping position and a release position, wherein the actuatable and stationary gripping members are insertable into the hub of the top CD when in the release position and grip the hub of the top CD when in the gripping position.

3. The CD gripper of claim 1, wherein the actuatable and stationary gripping members include a limiting surface, which extends beyond the hub of the top CD toward an outer diameter of the top CD when the actuatable and stationary gripping members are inserted into the hub of the top CD.

4. The CD gripper of claim 1, wherein the actuatable and stationary gripping members include a guide surface that is adapted to guide the gripping members into the hub of the top CD.

5. The CD gripper of claim 1, including a position sensor that is adapted to sense the location of the top CD, the sensor including an output signal indicating that the actuatable and stationary gripping members are in position to grip the top CD.

6. The CD gripper of claim 2, including a biasing member coupled to the actuatable and stationary gripping members and adapted to bias the actuatable gripping member toward one of the gripping and release positions.

7. A CD transporter including the CD gripper of claim 1, and further comprising:
   a base;
   a support tray for supporting the vertical stack of CD's; and
   a crane coupled to the base including an extension arm having a distal end coupled to the CD gripper, the crane configured to raise, lower, and pivot the extension arm to adjust the position of the CD gripper.

8. The gripper of claim 1, wherein at least one of the gripping members includes a limiting surface, which extends beyond the hub of the top CD toward an outer diameter of the top CD when the gripping members are inserted into the hub of the top CD.

9. A CD transporter for retrieving a top CD off a vertical stack of CD's, each of the CD's having a hub, the CD transporter comprising:
   a base;
   a support tray mounted to the base for supporting the vertical stack of CD's;
   a crane having a pedestal mounted to the base and a movable extension arm mounted to the pedestal and having a distal end; and
   a CD gripper mounted to the distal end of the extension arm and having an actuatable gripping member having a hub engaging surface and a CD separating protrusion, and at least one stationary gripping member having a hub engaging surface.

10. The CD transporter of claim 9, further comprising an elevating member coupled to a proximal end of the extension arm and adapted to raise and lower the extension arm.

11. The CD transporter of claim 9, further comprising a crane rotator coupled to a proximal end of the extension arm and adapted to rotate the extension arm in a horizontal plane.

12. The CD transporter of claim 9, wherein the base includes an interface for aligning a processing device with the CD gripper.

13. A method for gripping a top CD off a vertical stack of CD's, wherein the top CD is positioned above an adjacent CD, each of the CD's having a hub, the method comprising steps of:
   (a) providing a plurality of gripping members, each having a hub engaging surface and at least one of the gripping members having a CD separating protrusion;
   (b) inserting the gripping members within the hub of the top CD;
   (c) actuating at least one of the gripping members toward the hub of the top CD;
   (d) applying a separating force with the CD separating protrusion between a bottom surface of the top CD and a top surface of the adjacent CD; and
   (e) gripping the top CD with the hub engaging surfaces of the gripping members.

14. The method of claim 13 further comprising steps of:
   (f) raising the top CD off the stack of CD's; and
   (g) transporting the top CD to a pre-determined location.

15. The method of claim 13, wherein the applying step (d) and the gripping step (e) include a step of actuating at least one gripping member from a release position to a gripping position.

16. The method of claim 13, wherein the inserting step (b) includes placing the gripping members in a release position.

17. A compact disc (CD) gripping for gripping a top CD off a vertical stack of CD's, each of the CD's having a hub, the CD gripper comprising:

multiple gripping members, each including a hub engaging surface, the gripping members having a release position in which the gripping members are insertable into the hub of the top CD, and a gripping position in which the hub engaging surfaces grip the hub of the top CD; and a CD separating protrusion adjacent the hub engaging surface of at least one of the gripping members, the protrusion configured to apply a separating force between a bottom surface of the top CD and a top surface of the adjacent CD when the gripping members are moved from the release position to the gripping position.

18. The gripper of claim 17, wherein the CD separating protrusion extends from the hub engaging surface of one of the gripping members.

19. The gripper of claim 18, wherein the CD separating protrusion includes a triangular cross-section.

20. The gripper of claim 17 including an actuator configured to actuate at least one of the gripping members to thereby move the gripping members between the release and gripping positions.

21. The gripper of claim 17, wherein at least one of the gripping members includes a guide surface that is adapted to guide the gripping members into the hub of the top CD.

22. The gripper of claim 17, including a position sensor having an output signal indicating that the gripping members are in position to grip the hub of the top CD.

23. The gripper of claim 17, including a biasing member coupled to at least one of the gripping members and adapted to bias the gripping members toward one of the gripping and release positions.

24. A CD transporter including the CD gripper of claim 16, and further comprising:

a base;

a support tray for supporting the vertical stack of CD's; and a crane coupled to the base including an extension arm having a distal end coupled to the CD gripper, the crane configured to raise and lower the extension arm to adjust the position of the CD gripper.

* * * * *

UNITED STATES PATENT AND TRADEMARK OFFICE
CERTIFICATE OF CORRECTION

PATENT NO.   : 6,802,070 B2
DATED        : October 5, 2004
INVENTOR(S)  : Todd A. Britz et al.

It is certified that error appears in the above-identified patent and that said Letters Patent is hereby corrected as shown below:

Column 6,
Line 65, in first instance delete "gripping" and insert -- gripper --

Column 8,
Line 12, delete "16" and insert -- 17 --

Signed and Sealed this

Fifth Day of July, 2005

JON W. DUDAS
*Director of the United States Patent and Trademark Office*